April 10, 1956 K. L. JOHNSON 2,741,288
THREAD ROOT ELASTIC LOCK MEANS
Filed April 15, 1950 2 Sheets-Sheet 1

INVENTOR.
Kenneth L. Johnson
BY
FOR Green, McCallister & Miller
HIS ATTORNEYS

April 10, 1956 K. L. JOHNSON 2,741,288
THREAD ROOT ELASTIC LOCK MEANS
Filed April 15, 1950 2 Sheets-Sheet 2

INVENTOR.
Kenneth L. Johnson
BY
FOR Green, McCallister & Miller
HIS ATTORNEYS

United States Patent Office 2,741,288
Patented Apr. 10, 1956

2,741,288
THREAD ROOT ELASTIC LOCK MEANS
Kenneth L. Johnson, Edinboro, Pa.

Application April 15, 1950, Serial No. 156,166

5 Claims. (Cl. 151—7)

This invention relates to threaded fasteners and more particularly to self-locking threaded fasteners of the interference type using a deformable non-metallic locking element in the make-up thereof.

Several types of self-locking threaded fasteners falling within this classification are to be found in the patented fastener art, but only one has made any marked impression commercially. That one is the self-locking nut manufactured and sold under the trade name "ESNA." "ESNA" nuts employ an unthreaded annular non-metallic locking element which is located within a housing formed in part from a hollow cylindrical extension of the nut body, and the only commercially satisfactory method of making such nuts has been to machine the same from solid stock on automatic screw machines.

Since the height of the nut body with its hollow cylindrical extension is roughly twice that of the ordinary nut, the section of bar stock from which such a nut is formed contains substantially twice as much material as an ordinary nut of the same size. A good portion of this material is wasted as turnings in forming the hollow cylindrical extension and this wastage plus the time required in forming the hollow extension and the threaded part of the nut on a screw machine, makes for a relatively slow production rate and high cost.

Numerous attempts have been made to produce a satisfactory self-locking nut by coating some or all of the threads of standard nuts with some form of relatively soft deformable locking material. The patented art, beside containing numerous patents in which the threads of nuts, bolts and other screws are coated with relatively soft metal, adhesives and other coating material, contains three patents granted to I. W. Woodward which disclose methods of selectively supplying coating to the threads, or thread convolutions of standard nuts in order to convert the same into nuts of the self-locking type. These three patents are as follows: No. 1,137,941 of May 4, 1915, No. 1,175,034 of March 4, 1916, No. 1,368,087 of February 8, 1921.

None of these patented "coating" procedures nor the self-locking nuts disclosed in the above patents has made an impression on the commercial fastener art and I believe that one reason for this is due to the variations from given ideal dimensions in the thread form found in practically all standard commercial nuts and bolts.

Certain variations in dimensions in the thread form must be permitted in order to obtain a reasonable tool life and promote ease of manufacture. These variations or dimensional tolerances must be so limited, however, on both the nuts and bolts that a nut made by one manufacturer will fit a bolt made by another and vice versa. This implies that there must be a minimum amount of clearance between the threads of a nut and the threads of a bolt. In order to maintain the greatest strength, or resistance to stripping of the threads, the maximum amount of permissible clearance must also be fixed. Because of the necessity for these two limitations, a schedule of dimensional tolerances for both nuts and bolts has been set up by the American Institute of Bolt, Nut and Rivet Manufacturers.

Since the amount of clearance between a nut and bolt of the same nominal size depends upon the relationship of the specific dimensions of the thread form of each, and since this clearance can at times be zero, the introduction of a specific amount of plastic or deformable material into the thread form of mass produced nuts or bolts is not practical.

For example, the smallest permissible major diameter of a ½"-20 nut is .500". The largest permissible major diameter of a ½"-20 bolt is .500". Obviously, there is no room between the two for any deformable material. Although such fits are seldom encountered, it is impossible in a practical or commercial sense to produce self-locking nuts or bolts by coating the threads of either with a deformable material to take up the clearances and exert a suitable locking force between such nut and bolt. This is because of the tolerances and crest clearances permitted by the American Institute of Bolt, Nut and Rivet Manufacturers.

It will be apparent that if there is enough deformable material present on the threads of either to take up the clearance in a loose fit, there will be an excess in the case of a somewhat closer fit, to a point where a compressive force many times that which is desired may be built up. In cases short of this extreme, the deformable coating material bunches and becomes so broken up that it comes off even before the nut is completely mounted on the bolt. In some cases, the coating is compressed to such a small section that, although it appears satisfactory, it either comes off during the first application of the nut or is transferred from the nut threads to the bolt threads.

An object of this invention is to produce an improved reusable self-locking threaded fastener of the interference type using a deformable non-metallic locking element in its make-up.

Another object is to produce an improved reusable self-locking threaded fastener of the interference type using a standard nut blank as a starting piece.

Another object is to produce an improved reusable self-locking threaded fastener of the interference type using a standard bolt blank as a starting piece.

Another object is to produce an improved reusable self-locking threaded fastener of the interference type using a standard stud blank as a starting piece.

Another object is to produce an improved reusable self-locking threaded fastener of the interference type using a standard cap screw blank as a starting piece.

A still further object is to produce an improved reusable self-locking nut of the interference type, the threaded nut body of which can be mass produced on standard automatic tapping machines by using slightly modified taps.

A still further object is to produce an externally threaded fastener the threaded body of which can be mass produced on standard automatic thread rolling machines using a slightly modified die member.

These and other objects which will be apparent to those skilled in the threaded fastener art, I attain by means of the fasteners described in the specifications and illustrated in the drawings accompanying and forming part of this application.

The self-locking fasteners of this invention in the preferred form, both internally and externally threaded, are provided with a thread form that varies at its root portion from the conventional truncated thread form by having a recess 10 adjacent the root portion of its threads, or thread convolutions, for receiving a body of elastically deformable non-metallic locking material 11.

Figure 1:
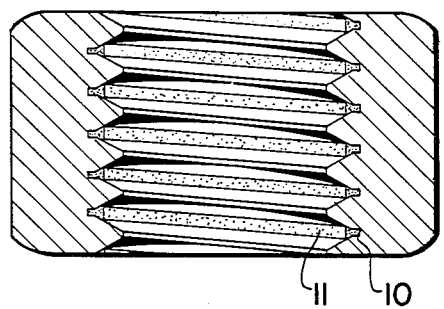
Figure 1 is a sectional view of a nut embodying this invention taken in a plane through the center of the nut and includes its major axis.
Figure 2:
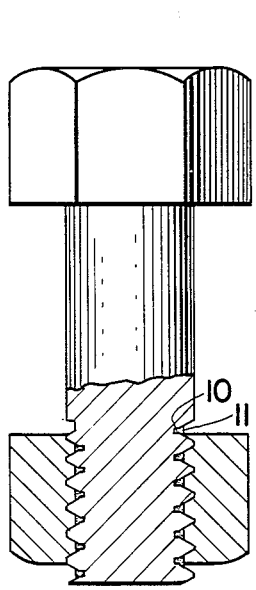
Fig. 2 is a view partially in elevation and partially in section of a self-locking bolt embodying this invention, and is shown equipped with a standard nut.
Figure 3:
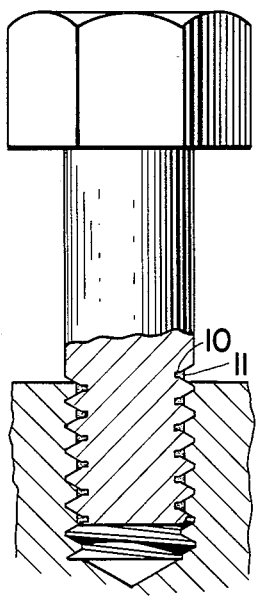
Fig. 3 is a view partially in section and partially in elevation of a self-locking cap screw embodying this invention shown in a tapped hole.
Figure 4:
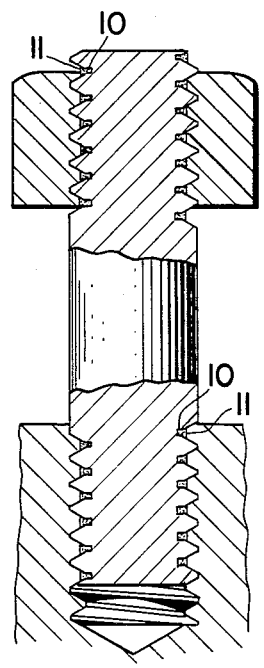
Fig. 4 is a view partially in elevation and partially in section illustrating a self-locking stud embodying this invention screwed into a tapped hole in a support member and equipped with the self-locking nut of this invention being on a plain washer and holding a supported element in place.
Figure 5:
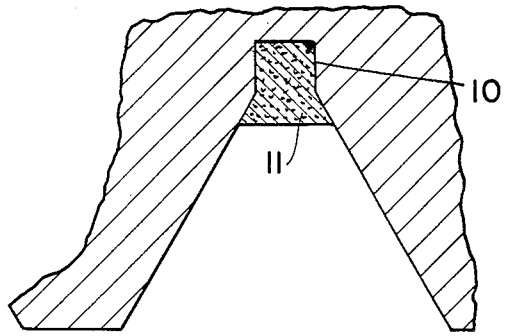
Fig. 5 is an enlarged view showing the root portion of two thread convolutions of either a self-locking nut, self-locking bolt, cap screw or stud embodying this invention; the view being taken in a plane which includes the longitudinal axis of either an internally or externally threaded fastener element of this invention in its preferred form.

Locking material 11 fills recess 10 and extends outwardly therefrom, as best shown in Figure 5, to be engaged by the threads or thread convolutions of a mating fastener element.

The thread form, altered to provide recess 10 is filled with locking material 11 to a depth that will provide sufficient interference with a bolt, the crest of the thread of which has the smallest permissible major diameter. When a self-locking nut of this invention is mounted on a bolt having the largest permissible diameter, the interference of course is greater, but is still within reasonable bounds and a sufficient depth of undeformed locking material 11 remains within recess 10 to insure reusability or future effectiveness of the body of locking material as a whole.

By way of example, in making a ½"–20 nut embodying this invention, the nut blank is first provided with a thread form having a major diameter of .520". This thread form is then filled with elastically deformable locking material to a depth which will provide a major diameter of .470". The interference encountered by a bolt the major diameter of which is .492", (the smallest permitted by the Institute) is sufficient to occasion an acceptable mounting torque. When such a self-locking nut is mounted on a mating bolt having the largest permissible major diameter of .500", the deformed locking material still retains a depth of .010" which insures retention of its effectiveness for reuse.

While there are many elastically deformable materials that may be suitable for use in the make-up of the lock nut of this invention, I prefer a material manufactured and sold by the Dow Chemical Company under the trade name "Saran" which is a polymerized vinylidene chloride resin; or nylon, which is a superpolymeric condensation product of a polybasic acid and a polyamine, manufactured and sold by the Du Pont de Nemours Co.

Both of these materials are thermoplastic and are easily applied to the nut by extrusion through a small orifice in a suitable die member.

Figure 8:
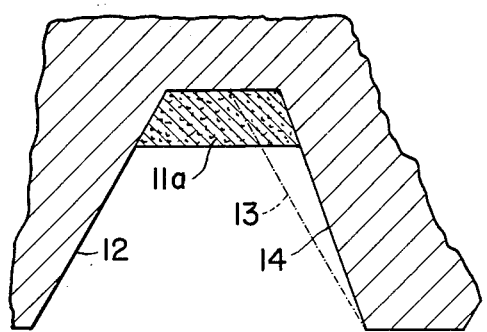
Fig. 8 is a view similar to Fig. 5 in all respects except that it discloses a modified form which may be desired under some circumstances.

Figure 8 discloses a modified thread form and insert for a fastener device to be used with a mating fastener element the threads of which are within the tolerances specified by the Institute. The threads of such fastener device are such that the clearance between portions of the same and the threads of such threaded element is greater than permitted by the Institute, thus providing a space in such fastener device for receiving a body of locking material to be traversed and engaged by the threads of such fastener element.

In this modification, the thread form varies from the conventional form—that specified by the Institute—by having one thread face 12 thereof normal or at an angle of 30° measured in an axial plane, and the opposite face preferably about 20° measured in an axial plane. This 20° face must be on the side of the thread that does not bear the tensile load of the bolt, if the thread is in a nut and the tensile load of the nut, if the thread is in a bolt. The load bearing side of the thread, as shown, has the normal conventional form specified by the Institute. In this modified form, the other dimensions are such as prescribed by the Institute.

In this modification, the thread form is provided with a body of elastically deformable locking material 11a of sufficient volume to create a major diameter which is smaller than the minimum permissible major diameter of the bolt thread with which it is to be used by an amount such that it will be displaced into and overfill the clearance space prepared for the same. This could be the space between dot and dash line 13 and face 14 of the thread form; that is, the clearance space defined by the side 14 and the adjacent side of the bolt thread upon which the modified nut is threaded.

It will be apparent that the recess of the preferred form and the clearance space of the modified form can be applied equally well to internally threaded and externally threaded fasteners, that is, to nuts as well as bolts, cap screws and studs. In all cases, an effective locking action is obtained and the effective control of this locking action over the span of dimensional tolerance obtained by displacement of surplus insert material into the clearance space defined by the crest of the thread of the element that contains the insert material and the root of the thread of the mating element—that element that does not contain the insert material.

Figure 6:
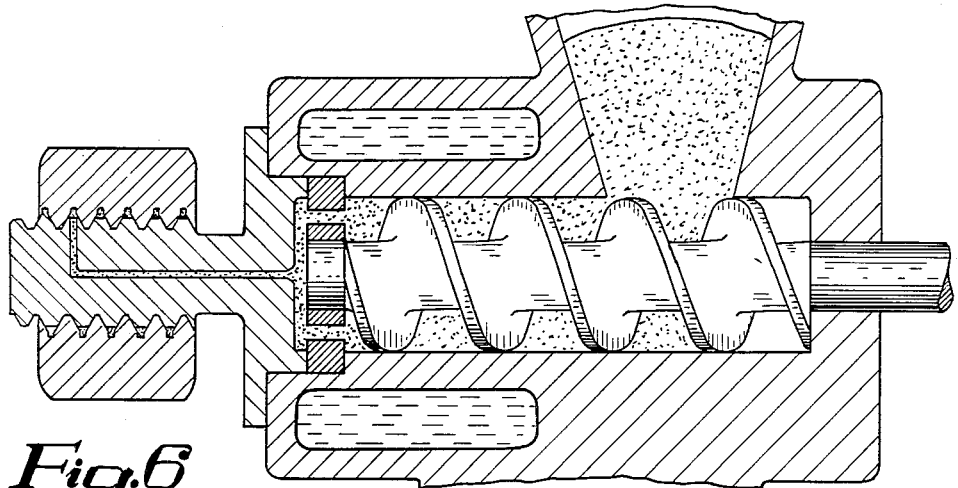
Fig. 6 is a schematic illustration depicting one method of applying the non-metallic locking material to the root portions of the thread convolutions of an internally threaded fastener member such as a nut.

The locking material which is preferably a thermoplastic as mentioned above, can be applied by a suitable extrusion device. Figure 6 shows the thermoplastic material being applied to the root portion of a nut while Fig. 7 shows the thermoplastic material being applied to the root portion of an externally threaded device such as a cap screw.

Figure 7:
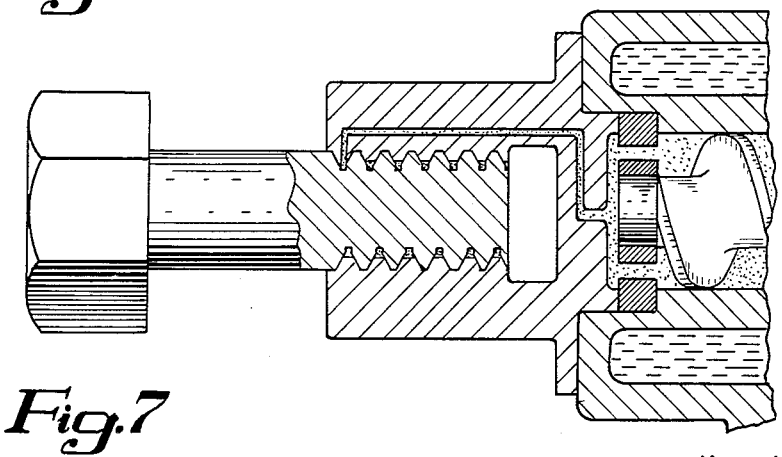
Fig. 7 is a view similar to Fig. 6 and schematically depicts the method of applying the locking material to the root portion of the thread convolutions of an externally threaded fastener member embodying this invention.

In the schematic showing of Figs. 6 and 7, the thermoplastic material is depicted as having been applied while the fastener element was being threaded onto or into the threaded part of the machine, but of course, it can be applied while the threaded element is being backed off or out of such threaded part of the machine.

What I claim is:

1. In a reusable self-locking joint of the character shown and described between a male element of substantially rigid material having an external thread thereon and therealong and an interfitting female element of substantially rigid material having an internal thread therein and therealong substantially complementary in cross-section to and mating with the thread of the male element, a radially-outwardly open recess portion formed in and extending along the root of the thread of one of said elements, said recess portion having a base portion in a spaced relationship with the crest of the thread of the other of said elements and having side walls formed at a greater angle from the longitudinal axis of said element than the sides of said threads but not greater than 90° from said axis, a length of elastically deformable non-metallic material positioned within and in secure engagement along said recess portion for compression-abutment between said base portion and the crest of the thread of the other of said elements, and said length of material having a body portion of wider section therealong that projects radially-outwardly from said recess portion and is compression-engaged along its length by the crest of the thread of the other of said elements and elastically deformed thereby along the mating threads to lock them in position with respect to each other.

2. A self-locking joint as defined in claim 1 wherein, said recess portion is of substantially rectangular section, and said body portion of said length of material projects radially outwardly from said recess portion in engagement along and with opposed flanks defining the root of the thread of the one of said elements.

3. In a reusable self-locking joint of the character shown and described between a male element of substantially rigid material having an external thread thereon and therealong and an interfitting female element of substantially rigid material having an internal thread therein and therealong substantially complementary in cross-section to and mating with the thread of the male element, a radially-outwardly open recess portion formed in and extending along the root of the thread of one of said elements, said recess portion having a base portion in a spaced relationship with the crest of the thread of the other of said elements and having side walls formed at a greater angle from the longitudinal axis of said element than the sides of said threads but not greater than 90° from said axis, a length of elastically deformable non-metallic material positioned along said recess portion for compression-abutment between said base portion and the crest of the thread of the other of said elements, said length of material having an inner body portion positioned along and in engagement with said recess portion and having an outer body portion of greater width than said base portion, said outer body portion projecting radially-outwardly from said inner body portion and beyond said recess portion for compression-engagement along its length by the crest of the thread of the other of said elements, and said length of material being elastically deformed by such defined engagement along the mating threads to lock them in position with respect to each other.

4. A self-locking joint as defined in claim 3 wherein, said outer body portion has a thickness cross-section of wedge-shape therealong, and said length of locking material is elastically flowable along said recess portion toward an open end of the root of the thread of said one element when the elements are in an interfitting relationship.

5. A self-locking joint as defined in claim 3 wherein, said recess portion is of substantially rectangular section, and said inner body portion is of substantially rectangular section within said recess portion.

References Cited in the file of this patent

UNITED STATES PATENTS

| | | |
|---|---|---|
| 1,368,087 | Woodward | Feb. 8, 1921 |
| 1,893,067 | Arenz | Jan. 3, 1933 |
| 2,177,100 | Frame | Oct. 24, 1939 |
| 2,405,088 | Clauson | July 30, 1946 |
| 2,409,638 | Lyon | Oct. 22, 1946 |
| 2,421,105 | Warren | May 27, 1947 |
| 2,437,638 | Evans | Mar. 9, 1948 |
| 2,473,752 | Johnson | June 21, 1949 |